Oct. 15, 1957 — T. G. BRASHEAR, JR — 2,810,063
WELDING APPARATUS
Filed Dec. 9, 1954

Inventor
Turner G. Brashear, Jr
By Wallace and Cannon
Attorneys

2,810,063
WELDING APPARATUS

Turner G. Brashear, Jr., El Cerrito, Calif., assignor to American Brake Shoe Company, New York, N. Y., a corporation of Delaware Application December 9, 1954, Serial No. 474,182

9 Claims. (Cl. 219—130)

This invention relates to arc welding and particularly to such welding of the submerged arc type.

In automatic as well as semi-automatic submerged arc welding processes the most common practice has been to perform hard surfacing and like alloy weld producing operations through the use of hollow welding rods in which an outer mild steel shell encloses and carries the alloy-producing constituents that are to combine with the mild steel sheet shell to produce a weld deposit of the desired analysis beneath the blanket of submerged melt flux. The submerged melt flux most commonly used in such welding work is granular and free flowing in character, possesses a relatively high electrical resistance so as to melt properly in the area about the submerged arc, and includes oxidizers and deoxidizers in known and well established ratios to insure that foreign material will be removed from the zone of the weld deposit in a known manner.

While the hard surface or alloyed weld deposits thus attained have been quite generally considered to be satisfactory from the standpoint of quality or analysis, the cost of such welding work has been objectionable primarily because of the cost of the composite or filled welding rods, the difficulty of handling, storing, and feeding such rods, and the relatively low rate of metal deposit that was inherent in the use of such composite rod.

These objectionable characteristics have long been recognized and have led to many different proposals intended to reduce the cost and increase the speed of such hard surfacing or alloy welding operations. One of these proposals has been the provision of a welding rod or wire of the desired alloy analysis, but this expedient has found little acceptance because of the almost insuperable difficulties involved in working, forming, handling and feeding the alloy material from which the rod must be made. A second proposal has been the use of an uncoated weld rod or wire with a submerged melt flux containing the desired alloy constituents. This second proposal has been found however, to be objectionable because the pick-up of alloying elements from the flux by the molten pool of weld metal is very small and erratic, thus resulting in weld deposits of an inferior character. Still another proposed method has involved the provision of an alloy feed tube for depositing a granular alloying mixture in the blanket flux just ahead of the weld point, but here again the welds are erratic and unsatisfactory because of lack of uniformity in the feed of the alloying mixture.

In view of the foregoing it is the primary object of the present invention to simplify and reduce the cost of such submerged arc welding operations; to increase the speed and rate of metal deposit in such submerged arc welding, to improve the nature of the weld deposit particularly by attaining a more uniform and reduced penetration of the weld deposit into the base metal, and to simplify performance of hard surfacing or alloy welding while at the same time increasing or improving the quality and uniformity of the resulting work.

Other and further objects of the present invention will be apparent from the following description and claims and are illustrated in the accompanying drawings which, by way of illustration, show a preferred embodiment of the present invention and the principle thereof and what I now consider to be the best mode in which I have contemplated applying that principle. Other embodiments of the inventions embodying the same or equivalent principle may be used and structural changes may be made as desired by those skilled in the art without departing from the present invention and the purview of the appended claims.

Figure 1:
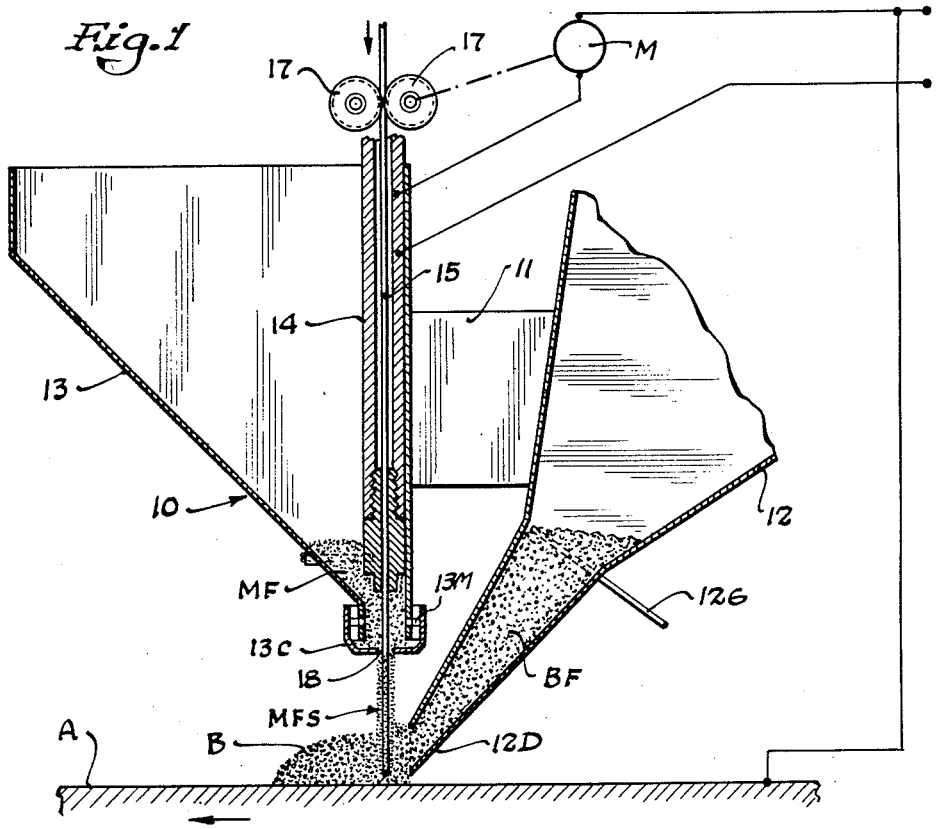
Fig. 1 is a vertical sectional view through a welding apparatus embodying the invention.
Figure 2:
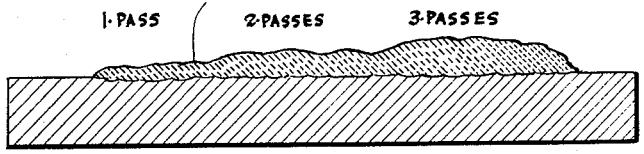
Fig. 2 is a cross sectional view through a workpiece hard surfaced through the use of the present invention.

For purposes of disclosure, a welding apparatus 10 is illustrated in Fig. 1 in an operative relation to a work piece A so that upon relative movement of the work piece A and the welding apparatus 10, a surfacing weld W–1 may be produced, as indicated in Fig. 2. The welding apparatus 10 includes a supporting frame 11 that carries a blanket-flux hopper 12 and a supplemental flux hopper 13 within which an electrode sleeve 14 is positioned so that a welding rod or wire 15 may be fed downwardly through the sleeve 14 and the lower end of the hopper 13 into the welding zone above the workpiece A and adjacent the discharge end 12D of the blanket flux hopper 12.

The hoppers 12 and 13 are so related to each other that upon relative movement of the work piece A and the apparatus 10 in the direction indicated by the arrow in Fig. 1, the granular blanket flux BF will be discharged at a rate determined by the setting of a gate valve 126 and will be deposited in an elongated blanket B on the work piece A and in such a relation that the projecting lower end of the welding wire 15 will thereafter move into the blanket B as shown in Fig. 1. Thus, the arc thereafter struck between the rod 15 and the work A will be submerged in the blanket B. The welding or surfacing operation is herein shown as being performed on a flat surface, but it will be evident that surfacing of cylindrical parts by rotation thereof beneath hoppers 12 and 13 constitutes another type of welding or surfacing operation that may be performed under the present invention.

The welding rod 15 is fed or advanced by a motor M and associated feed rolls 17, and the motor M is of such a character and is so connected in accordance with known practice that a predetermined arc length is maintained during operation of the apparatus.

The blanket flux BF is a known and commercially available kind that has heretofore been used in hard surfacing and other submerged melt or submerged arc welding, and under the present invention the alloying constituents are magnetically associated in metered amounts with the small diameter welding rod or wire 15 and thus fed in the proper proportion into the blanket B to the welding zone. Thus, a blanket flux known commercially as #50 Unionmelt may be employed, and it may be observed that the primary characteristics of such blanket flux are its high electrical resistance, its free flowing characteristics, and the inclusion of adequate oxidizing and deoxidizing components.

In carrying out the invention as thus described, the alloying constituents in granular or powdered form are combined, in proportions such as described hereinafter, with a granular or powdered magnetizable component such as powdered iron to afford a magnetizable granular flux MF that is supplied to the supplemental hopper 13 so that the magnetic field induced about the welding wire 15 by the welding current will serve to form a sleeve MFS of magnetic flux about the welding wire 15 as it passes through the lower end of the hopper 13 and downwardly out of a concentric metering orifice 18 formed in a lower end cap 13C of the hopper 13. The hopper 13 preferably has a magnetic valve means associated therewith as by means of permanent magnets 13M to prevent free flow of the flux MF from the hopper when the welding current is interrupted. The alloying components and the magnetizable components of the flux MF are, of course, thoroughly intermixed or blended, and are maintained in a homogeneous distribution with a binder such as sodium silicate. After application and drying of the binder, the mixture is crushed or ground to restore it to a granular or free flowing form.

The alloying components in the flux MF may of course vary as the selection and percentage in accordance with the alloy analysis desired in the weldment, while the percentage of magnetic material utilized in such flux MF may be varied considerably in accordance with the welding current to be employed, the nature of such current, and in accordance with the thickness of flux sleeve MFS that is required to produce the proper alloy in the weldment. Thus, where alternating current is to be used, the percentage of magnetic material may be somewhat greater than when direct current is to be employed, while greater percentages of magnetic material may be used as the thickness of the flux sleeve MFS is increased. Thus, when 30 volt A. C. is employed at about 400 amperes, the following formulations may be used as will be described:

| Ingredients | Formula No. 1 | Formula No. 2 |
|---|---|---|
| | Percent | Percent |
| Ferrochromium | 38 | 41 |
| Ferromanganese | 8 | 11 |
| Ferromolybdenum | 6 | 9 |
| Soft Iron Powder | 41 | 32 |
| Sodium Silicate Solution (powder) | 7 | 7 |

*Example A*

Using a magnetizable flux MF made according to formula 1 with a ⅛" high carbon welding wire 15 and with a metering orifice 18 of ¼" diameter, and 30 volts A. C. at 400 amperes, and using No. 50 Unionmelt as the blanket flux BF, the following results were obtained:

Deposition rate—12.5 lbs. metal per hour.
Wire to MF flux ratio—2.1 to 1.

$$\text{Efficiency} - \frac{\text{Metal deposited}}{\text{Wire} + \text{MF Flux used}} = 92.4\%$$

| | 1 pass | 2 pass | 3 pass |
|---|---|---|---|
| Average Rockwell C Hardness | 51 | 55 | 54 |
| Range, Rockwell C Hardness | 49–53 | 54–56 | 53–56 |

*Example B*

Using a magnetizable flux MF made according to formula 2 with a ⅛" high carbon welding wire 15 and with a metering orifice 18 of 7/32" diameter, and 30 volts A. C. at 400 amperes, and using No. 50 Unionmelt as the blanket flux BF, the following results were obtained:

Deposition rate—10.4 lbs. metal per hour.
Wire to MF Flux ratio—3.8 to 1.

$$\text{Efficiency} - \frac{\text{Metal deposited}}{\text{Wire} + \text{MF Flux used}} = 90.4\%$$

| | 1 pass | 2 pass | 3 pass |
|---|---|---|---|
| Average Rockwell C Hardness | 47 | 54 | 50 |
| Range, Rockwell C Hardness | 44–49 | 53–55 | 47–52 |

*Example C*

Using the same voltage amperage and type of current, and using the same blanket flux BF, a commercial filled or composite welding rod of 5/32" diameter and containing alloying components designed to produce the same analysis in the weldment as in Examples A and B, the following results were obtained:

Deposition rate—7.8 lbs. metal per hour.

$$\text{Efficiency} - \frac{\text{Metal deposit}}{\text{rod used}} = 95.3\%$$

| | 1 pass | 2 pass | 3 pass |
|---|---|---|---|
| Average Rockwell C Hardness | 43 | 50 | 50 |
| Range, Rockwell C Hardness | 39–44 | 49–52 | 46–54 |

Figure 3:
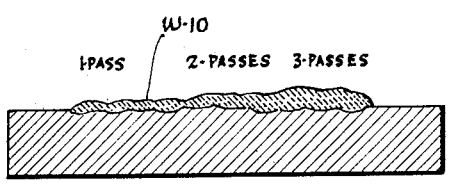
Fig. 3 is a similar cross sectional view of a workpiece that has been hard surfaced by conventional methods.

In Fig. 2 of the drawings, a cross sectional view is shown of the work produced under Example A, while in Fig. 3 of the drawings a similar view is shown of the work produced under the prior art method of Example C. Careful comparison of the work illustrated in Figs. 2 and 3 shows the actual metal build up attained under the present invention and as shown at W–1 in Fig. 2 to be appreciably greater than the build up W–10 by the prior art method used in producing the work illustrated in Fig. 3. This is of prime importance and advantage, and under the present invention is attained with a greatly reduced and more uniform penetration of the base metal, as will be evident upon comparison of Figs. 2 and 3. The consistent hardness and the narrow hardness ranges of the deposits attained under the present invention, as shown in the test results on Examples A and B, reflect high and meritorious operating efficiency and uniformity in the welding practice of the present invention.

The welding wire 15 is relatively low in cost, while the magnetizable alloying flux MF may be processed at a reasonable cost despite the relatively high cost of the alloying components thereof, and since the present invention accurately meters and efficiency utilizes the alloying flux MF, the cost per pound of metal deposited is found to be substantially less than by prior methods.

From the foregoing description it will be evident that the present invention simplifies and reduces the cost of producing alloyed weldments, while at the same time attaining reduced and more uniform penetration of the base metal and producing uniform and high quality surfacing or other weldments.

Thus, while I have illustrated and described the preferred embodiment of my invention, it is to be understood that this is capable of variation and modification, and I therefore do not wish to be limited to the precise details set forth, but desire to avail myself of such changes and alterations as fall within the purview of the following claims.

I claim:

1. The method of alloy welding which consists in progressively depositing a line of high resistance blanket flux containing slag forming and oxidizing and deoxidizing agents to form an elongated blanket of such flux along the work to be welded, advancing a mild steel welding wire endwise into said flux blanket, applying welding current across the work and the welding wire to produce an arc therebetween and a magnetic field about said welding wire, producing endwise feeding movement of said welding wire and relative movement of said wire and said work parallel to the elongated blanket of flux, supplying an excess of granulated magnetizable alloying flux to a portion of such magnetic field that is spaced from the work to form an initial sleeve of alloying flux about the advancing wire, and displacing outer portions of such initial sleeve to limit the thickness thereof and afford a final flux sleeve of predetermined thickness as it advances with the wire toward the weld zone to thereby uniformly proportion the alloying flux with respect to the volume of the advancing wire.

2. The method of alloy welding which consists in progressively depositing a line of high resistance blanket flux containing slag forming and oxidizing and deoxidizing agents to form an elongated blanket of such flux along the work to be welded, advancing a mild steel welding wire endwise into said flux blanket, applying welding current across the work and the welding wire to produce an arc therebetween and a magnetic field about said welding wire, producing endwise feeding movement of said welding wire and relative movement of said wire and said work parallel to the elongated blanket of flux, supplying an excess of granulated magnetizable alloying flux that comprises a mixture of powdered iron and finely divided ferrous metal alloy selected from the group consisting of ferrochromium, ferromanganese, and ferromolybdenum, the powdered iron and ferrous metal alloy being bound together as individual granules by a hardened silicate to a portion of such magnetic field that is spaced from the work to form an initial sleeve of alloying flux about the advancing wire, and displacing outer portions of such initial sleeve to limit the thickness thereof and afford a final flux sleeve of predetermined thickness as it advances with the wire toward the weld zone to thereby uniformly proportion the alloying flux with respect to the volume of the advancing wire.

3. The method of alloy welding which consists in progressively depositing a line of blanket flux to form an elongated blanket of such flux along the work to be welded, advancing welding wire endwise into said flux blanket, applying welding current across the work and the welding wire to produce an arc therebetween and a magnetic field about said welding wire, producing endwise feeding movement of said welding wire and relative movement movement of said wire and said work parallel to the elongated blanket of flux, progressively forming granulated magnetizable alloying flux in a flux sleeve of predetermined thickness about the advancing wire in said magnetic field so that the alloy sleeve is uniformly proportioned with respect to the volume of the advancing wire and is fed with the wire into the welding zone beneath the blanket flux.

4. The method of alloy welding which consists in progressively depositing a line of blanket flux containing welding protective agents to form an elongated blanket of such flux along the work to be welded, advancing a welding wire endwise into said flux blanket, applying welding current across the work and the welding wire to produce an arc therebetween and a magnetic field about said welding wire, producing endwise feeding movement of said welding wire and relative movement of said wire and said work parallel to the elongated blanket of flux, progressively forming granulated magnetizable alloying flux comprising a mixture of powdered iron and finely divided ferrous metal alloy, and ferromolybdenum, the powdered iron and ferrous metal alloy being bound together as individual granules in a flux sleeve of predetermined thickness about the advancing wire in said magnetic field so that the alloy sleeve is uniformly proportioned with respect to the volume of the advancing wire and is fed with the wire into the welding zone beneath the blanket flux.

5. The method of alloy welding which consists in progressively depositing a line of high resistance blanket flux containing slag forming and oxidizing and deoxidizing agents to form an elongated blanket of such flux along the work to be welded, advancing a mild steel welding wire endwise into said flux blanket, applying welding current across the work and the welding wire to produce an arc therebetween and a magnetic field about said welding wire, producing endwise feeding movement of said welding wire and relative movement of said wire and said work parallel to the elongated blanket of flux, progressively forming granulated magnetizable alloying flux that comprises at least one powdered alloying metal and soft iron powder bound together in a uniformly intermixed relationship and re-ground to a comminuted free flowing powder to afford a flux sleeve of predetermined thickness about the advancing wire in said magnetic field so that the alloy sleeve is uniformly proportioned with respect to the volume of the advancing wire and is fed with the wire into the welding zone beneath the blanket flux.

6. Alloy welding apparatus comprising a support having a blanket-flux hopper mounted thereon for progressively depositing a line of granulated high resistance blanket flux to form an elongated blanket of such granulated flux along the work to be welded, an alloy-flux hopper mounted on said support and having guide means associated therewith for guiding a welding wire through said alloy-flux hopper and out of the discharge end of such flux-hopper endwise into such a flux blanket, means for applying endwise feeding movement to said welding wire, means for applying welding current across the work and the welding wire to produce an arc therebetween and afford magnetic field about said welding wire for attracting magnetizable flux to such a wire within said alloy-flux hopper, magnet means mounted on said alloy-flux hopper and positioned to prevent discharge of alloy-flux from the discharge end of said alloy-flux hopper when the apparatus is not in use, and a metering gate on the discharge end of said alloy-flux hopper to reduce the thickness of the attracted flux to a flux sleeve of predetermined thickness about the advancing wire so that the alloy-flux sleeve is uniformly proportioned with respect to the volume of the advancing wire and is fed with the wire into the welding zone beneath the blanket flux.

7. Alloy welding apparatus comprising a support having a blanket-flux hopper mounted thereon for progressively depositing a line of submerged melt blanket flux to form an elongated blanket of such flux along the work to be welded, an electrode affording guide means for guiding a welding wire endwise into such a flux blanket, an alloy-flux hopper carried on said support for containing a magnetizable alloy-flux and having a lower discharge end positioned to surround such a welding wire below said electrode so that a magnetic field produced about such a welding wire during use of the apparatus will attract alloy-flux to the wire within such alloy-flux hopper, magnet means mounted on said alloy-flux hopper and positioned to prevent discharge of alloy-flux from the discharge end of said alloy-flux hopper when the apparatus is not in use, and a metering gate on said discharge end of said alloy-flux hopper having a metering opening concentric with the axis of the wire to reduce the thickness of the attracted flux to afford a flux sleeve of predetermined thickness about the advancing wire.

8. Alloy welding apparatus comprising a support having a blanket flux hopper mounted thereon for progressively depositing a line of submerged melt blanket flux to form an elongated blanket of such flux along the work to be welded, guide means for guiding a welding wire along a predetermined axis endwise into such a flux blanket, an alloy-flux hopper carried on said support for containing a magnetizable alloy-flux and having a lower discharge end terminating in a lower discharge opening centered on said axis and positioned to surround such a welding wire below said guide means so that a magnetic field produced about said welding wire during use of the apparatus will attract alloy-flux to the wire within such alloy-flux hopper, and magnet means mounted on said alloy-flux hopper and positioned to prevent discharge of alloy-flux from the discharge end of said alloy-flux hopper when the apparatus is not in use.

9. Alloy welding apparatus comprising a support having a blanket flux hopper mounted thereon for progressively depositing a line of submerged melt blanket flux to form an elongated blanket of such flux along the work to be welded, guide means for guiding a welding wire endwise into such a flux blanket, means including an alloy-flux hopper carried on said support for forming a sleeve of magnetizable alloy-flux about such a welding wire below said guide means and held in place on the advancing wire by a magnetic field produced about said welding wire when the apparatus is in use, and magnet means mounted on said alloy-flux hopper and positioned to prevent discharge of alloy-flux from the discharge end of said alloy-flux hopper when the apparatus is not in use.

References Cited in the file of this patent

UNITED STATES PATENTS

| | | |
|---|---|---|
| 2,009,240 | Paterson | July 23, 1935 |
| 2,065,157 | Stine | Dec. 22, 1936 |
| 2,175,607 | Kinkead | Oct. 10, 1939 |
| 2,191,473 | Blumberg | Feb. 27, 1940 |
| 2,269,538 | Lewbers | Jan. 13, 1942 |

FOREIGN PATENTS

| | | |
|---|---|---|
| 394,773 | Great Britain | July 6, 1933 |
| 608,270 | Great Britain | Sept. 13, 1948 |